United States Patent [19]

Kuske et al.

[11] Patent Number: 5,085,706
[45] Date of Patent: Feb. 4, 1992

[54] SYNTHETIC PIGMENT HAVING THE COLOR OF NATURAL UNCALCINED UMBER AND ITS USE

[75] Inventors: Peter Kuske; Gunter Buxbaum, both of Krefeld, Fed. Rep. of Germany

[73] Assignee: Bayer Aktiengesellschaft, Leverkusen-Bayerwerk, Fed. Rep. of Germany

[21] Appl. No.: 733,329

[22] Filed: Jul. 22, 1991

[30] Foreign Application Priority Data

Aug. 2, 1990 [DE] Fed. Rep. of Germany ....... 4024566

[51] Int. Cl.⁵ ................................................. C09C 1/22
[52] U.S. Cl. ...................................... 106/456; 106/401
[58] Field of Search ............................... 106/456, 401

[56] References Cited

U.S. PATENT DOCUMENTS

| | | | |
|---|---|---|---|
| 3,382,174 | 5/1968 | Hund | 252/62.57 |
| 4,701,221 | 10/1987 | Brunn et al. | 106/456 |
| 4,702,775 | 10/1987 | Ostertag et al. | 106/456 |
| 4,753,680 | 6/1988 | Burow et al. | 106/456 |
| 5,002,609 | 3/1991 | Rademachers et al. | 106/456 |

*Primary Examiner*—Karl Group
*Assistant Examiner*—Chris Gallo
*Attorney, Agent, or Firm*—Connolly & Hutz

[57] ABSTRACT

Pigments having the color of natural uncalcined umber contain more than 85% by weight of iron oxides, expressed as $Fe_2O_3$, and less than 0.1% by weight of crystalline silica are obtained by mixing iron oxides of spinel structure and/or hematite structure with or without iron oxide yellow and said pigments are useful in coloring paints, lacquers and building materials.

12 Claims, No Drawings

SYNTHETIC PIGMENT HAVING THE COLOR OF NATURAL UNCALCINED UMBER AND ITS USE

This invention relates to a synthetic pigment having the color of natural uncalcined umber and to the use of this pigment.

BACKGROUND OF THE INVENTION

Natural umbers differ widely in their composition, depending on origin, and consist of a mixture of various minerals, such as goethite, manganese dioxide, alumosilicates and crystalline quartz. They contain inter alia approximately 40% $Fe_2O_3$, 5 to 10% $Mn_2O_3$ and 10 to 20% $SiO_2$.

It is known that naturally occurring pigments show distinct variations in composition and color which are troublesome in many applications. In addition, the presence of crystalline quartz in quantities of more than 1.0% is objectionable on account of the carcinogenic effect of corresponding fine dusts. The MAC value for dusts such as these is 0.15 mg solids per $m^3$ air. In addition, under the Californian Safe Drinking Water and Toxic Enforcement Act, 1985 (Proposition 65), goods containing more than 0.1% crystalline quartz have to be declared.

For the reasons stated above, many naturally occurring pigments have already been displaced from their applications by synthetic pigments because synthetic pigments are not attended by the disadvantages mentioned.

Natural umbers are used inter alia in paints and lacquers, for example in emulsion paints and multipurpose tinting pastes. The umbers are often used in admixture with other pigments in various quantitative ratios, for example for "breaking" colors. For the applications mentioned, it is very important that a synthetic pigment such as this should correspond to natural umber in color in various mixing ratios (lightening) of pigment and white pigment. There has been no shortage of attempts to adjust a corresponding pigment by mixing commercially available pigments, more particularly by mixing iron oxides. However, corresponding mixtures, such as commercial iron oxide brown pigments for example, undergo an unwanted change of shade with increasing lightening.

Accordingly, the problem addressed by the present invention was to provide a synthetic pigment having the color of natural uncalcined umber which would not have any of the described disadvantages.

BRIEF DESCRIPTION OF THE INVENTION

Pigments which satisfy these requirements have now surprisingly been found. They have the color of natural uncalcined umber and are characterized by an iron content, expressed as $Fe_2O_3$, of more than 85% by weight and a content of crystalline silica of less than 0.1% by weight. The pigments according to the invention can be obtained by mixing iron oxides of spinel structure and/or hematite structure and, optionally, an iron oxide yellow.

DETAILED DESCRIPTION

Accordingly, the pigment according to the invention preferably consists of a mixture of synthetic magnetite black ($Fe_3O_4$), at least one synthetic maghemite brown ($\gamma$-$Fe_2O_3$) or hematite red ($\beta$-$Fe_2O_3$) and, optionally, synthetic goethite yellow ($\gamma$-FeOOH) and/or lepidocrocite orange ($\gamma$-FeOOH).

The preparation of the starting materials is generally known, cf. for example Ullmann, Enzyklopädie der technischen Chemie, 4th Edition, Weinheim (1979), Vol. 18, pages 600–604. A preferred process for the production of maghemite is described in DE-A 3 820 499.

In one preferred embodiment, the pigment according to the invention contains magnetite black in quantities of 10 to 80% by weight, hematite red in quantities of 0 to 60% by weight, maghemite brown in quantities of 0 to 30% by weight, goethite yellow in quantities of 1 to 40% by weight and lepidocrocite orange in quantities of 1 to 10% by weight as key constituents of the mixture.

In one particularly preferred embodiment, the mixture contains 50 to 75% by weight magnetite black, 1 to 40% by weight goethite yellow, 0 to 10% by weight hematite red and 0 to 30% by weight maghemite brown.

In addition, the low content of soluble salts in the pigment according to the invention is an advantage. According to DIN ISO 787/Part 8, it is less than 1.0% and preferably from 0.5 to 0.9%. The content of soluble salts in natural umbers, at up to 1.5%, is distinctly higher and is therefore a disadvantage for certain applications.

The pigment according to the invention preferably has an iron content, expressed as $Fe_2O_3$, of 85 to 99% and a manganese content of less than 1%. The crystalline quartz content was determined by diffractometry after repeated evaporation with hydrochloric acid and after calcination to hematite at 800° C. and is less than 0.1%. Accordingly, the low crystalline quartz content and the low manganese content are particularly advantageous because, in contrast to natural umber, no elaborate measures for avoiding dust emission have to be taken for the pigment according to the invention.

The pigment mixtures may be obtained in the usual way by mixing the various components and grinding the mixture in a dismembrator or in a vibrating disk mill. To determine the color tones, the pigments are colorimetrically evaluated both in pure form and after lightening in various ratios in Alkydal ® F48 or L64 (alkyd resins, products of Bayer AG) in accordance with DIN 6174 (equivalent to ISO DIN 7724, 1–3 Drafts). Various quantities of pigments and $TiO_2$ R-KB-2 ® (a product of Bayer AG) were used to prepare the lightened forms. The color values are expressed in CIELAB units either as absolute values or in relation to a commercially available uncalcined umber.

The color of the pigments according to the invention is characterized in that the color angle h both for the pure form and for the form lightened with $TiO_2$ in a ratio of 1:10 may assume values of 60 to 90, the saturation C* being from 1 to 20 and preferably from 2 to 12. Accordingly, these pigments are clearly distinguished from known iron oxide pigments. To evaluate lightening behavior, the residual color differences between the pigments according to the invention and commercial umbers lightened in various ratios were determined. The pigment according to the invention shows very little difference in color from natural umbers both in pure form and in the lightened forms.

Commercially available iron oxide black pigments in the form of magnetite, red pigments in the form of hematite, yellow pigments in the form of goethite and/or lepidocrocite and a brown pigment in the form of maghemite ($\gamma$-Fe$_2$O$_3$) were used for the mixtures. Pigments showing neutral lightening behavior corresponding to natural umber were mainly obtained in the case of mixtures containing an iron oxide black as principal component and an iron oxide brown in the form of maghemite, an iron oxide red in the form of hematite and an iron oxide yellow in the form of goethite as secondary components.

The pigments according to the invention are strongly colored and show coloring strengths of 100 to 160% compared with natural umbers. The specific surface of the pigments according to the invention, as measured by the BET method, is from 10 to 30 and preferably from 15 to 20 m$_2$/g (DIN 66 131, nitrogen one-point method).

The pigments according to the invention are readily dispersible in binders of the type used for the production of multipurpose tinting pastes. The lower binder demand compared with natural umbers and the high solids content of the pastes obtained are particular advantages.

The present invention also relates to the use of the pigment according to the invention for the production of paints and lacquers, such as complete paints and tinting paints, to its use in multipurpose tinting pastes and to its use for pigmenting building materials.

The following Examples are intended to illustrate the invention without limiting it in any way.

COMPARISON EXAMPLES

The properties of commercial, natural, uncalcined umbers are investigated in Comparison Examples C1 to 4. The results of these investigations are set out in Tables 1.1, 1.2 and 1.3.

TABLE 1.1

Contents and physical data of natural uncalcined umbers

| | Comparison Examples | | | |
|---|---|---|---|---|
| | 1 | 2 | 3 | 4 |
| % Fe$_2$O$_3$ | 40.0 | 47.6 | 47.4 | — |
| % Mn$_2$O$_3$ | 6.9 | 9.5 | 6.6 | — |
| % SiO$_2$ | 21.4 | 13.3 | 20.8 | — |
| % Al$_2$O$_3$ | 3.3 | — | 3.5 | 3.6 |
| % Quartz, crystalline | 1.3 | 0.4 | — | 0.9 |
| Spec. surface, m$^2$/g | 64 | — | 82 | 103 |
| Oil number, g/100 g | 53 | — | — | 40 |

— = not determined

TABLE 1.2

Color values of the natural umbers of Comparison Example 1 lightened in various ratios

| Lightening pigment: TiO$_2$ | L* | a* | b* | C* | h |
|---|---|---|---|---|---|
| Pure form | 26.5 | 0.6 | 1.7 | 1.8 | 70.6 |
| 1:1 | 50.5 | 1.0 | 5.4 | 5.5 | 80.1 |
| 1:2 | 50.5 | 0.9 | 5.4 | 5.4 | 80.1 |
| 1:3.33 | 58.1 | 0.6 | 4.0 | 4.0 | 81.5 |
| 1:5 | 63.0 | 0.5 | 3.7 | 3.7 | 82.3 |
| 1:7 | 66.9 | 0.4 | 3.3 | 3.3 | 83.1 |
| 1:15 | 74.2 | 0.4 | 2.9 | 3.0 | 82.3 |
| 1:30 | 80.2 | 0.3 | 2.3 | 2.3 | 81.9 |

TABLE 1.3

Color values of the natural umbers of Comparison Examples 1–4 in pure form and in lightened form (1:10)

| Comparison Example | | L* | a* | b* | C* | h |
|---|---|---|---|---|---|---|
| C1 | Pure form | 26.5 | 0.6 | 1.7 | 1.8 | 70.6 |
| C2 | Pure form | 28.0 | 1.7 | 3.5 | 3.5 | 64.6 |
| C3 | Pure form | 26.6 | 0.3 | 2.3 | 2.3 | 82.4 |
| C4 | Pure form | 26.5 | 1.0 | 2.6 | 2.8 | 69.0 |
| C1 | Lightened | 70.7 | 0.4 | 3.0 | 3.9 | 82.4 |
| C2 | Lightened | 72.0 | 2.0 | 11.1 | 11.3 | 80.0 |
| C3 | Lightened | 71.7 | 0.7 | 4.2 | 4.3 | 80.5 |
| C4 | Lightened | 70.8 | 1.7 | 4.8 | 5.1 | 70.5 |

EXAMPLES

For the Examples, various commercial pigments were mixed with one another. Maghemite brown, as described in DE-A 3 820 499, was also used for some mixtures.

To prepare the mixtures, the components were combined, homogenized and ground in a dismembrator or in a vibrating disk mill. The compositions of the mixtures are shown in Table 2.1.

Bayferrox 318 is a synthetic magnetite black (Fe$_3$O$_4$). Bayferrox 930 and 415 are synthetic goethite yellows ($\alpha$-FeOOH). Bayferrox 110 is a synthetic hematite red ($\alpha$-Fe$_2$O$_3$). Bayferrox 943 is a synthetic lepidocrocite orange ($\gamma$-FeOOH).

TABLE 2.1

Composition of the mixtures of Examples 1–10

| | Mixture components in % by weight Bayferrox ®* | | | | | |
|---|---|---|---|---|---|---|
| Example | 318 | 930 | 415 | 110 | 943 | Maghemite brown |
| 1 | 70 | 4 | — | — | — | 26 |
| 2 | 70 | — | 4 | — | — | 26 |
| 3 | 59 | — | 10 | — | — | 40 |
| 4 | 40 | — | 20 | 10 | — | 30 |
| 5 | 50 | — | 30 | 10 | — | 10 |
| 6 | 40 | — | — | 20 | — | 40 |
| 7 | 10 | — | 10 | 20 | — | 60 |
| 8 | 55 | — | 40 | 5 | — | — |
| 9 | 58 | — | 37.5 | 4.5 | — | — |
| 10 | 60 | — | 30 | 5 | 5 | — |

*a product of Bayer AG

TABLE 2.2

Color values of Examples 1–10, pure form

| Example | L* | a* | b* | C* | h |
|---|---|---|---|---|---|
| 1 | 27.5 | 0.6 | 2.8 | 2.9 | 77.9 |
| 2 | 27.2 | 0.9 | 3.5 | 3.6 | 76.6 |
| 3 | 30.0 | 2.4 | 6.6 | 7.0 | 70.0 |
| 4 | 30.0 | 1.9 | 6.2 | 6.5 | 73.0 |
| 5 | 28.8 | 0.6 | 4.1 | 4.1 | 81.7 |
| 6 | 28.7 | 2.1 | 4.9 | 5.3 | 66.8 |
| 7 | 32.2 | 5.0 | 9.8 | 11.0 | 63.0 |
| 8 | 32.9 | 1.8 | 10.1 | 10.3 | 79.9 |
| 9 | 29.5 | 1.1 | 5.6 | 5.7 | 78.9 |
| 10 | 29.2 | 1.1 | 5.5 | 5.6 | 78.7 |

TABLE 2.3

Color values of Examples 1–10 in lightened form (1:10)

| Example | L* | a* | b* | C* | h |
|---|---|---|---|---|---|
| 1 | 67.3 | 0.8 | 3.3 | 3.4 | 76.4 |
| 2 | 68.6 | 1.3 | 3.2 | 3.5 | 67.9 |
| 3 | 70.4 | 2.9 | 7.1 | 7.7 | 67.8 |
| 4 | 70.1 | 2.4 | 6.9 | 7.3 | 70.8 |
| 5 | 70.3 | 0.8 | 4.2 | 4.3 | 79.2 |
| 6 | 67.3 | 2.9 | 5.6 | 6.3 | 62.6 |
| 7 | 69.1 | 5.4 | 11.3 | 12.5 | 64.6 |
| 8 | 74.0 | 1.3 | 7.7 | 7.8 | 80.4 |
| 9 | 71.3 | 1.0 | 3.7 | 3.8 | 74.9 |
| 10 | 71.8 | 1.1 | 3.5 | 3.7 | 78.7 |

TABLE 2.4

Color values of Example 1 for various lightening ratios

| Lightening ratio | L* | a* | b* | C* | h |
|---|---|---|---|---|---|
| Pure form | 27.5 | 0.6 | 2.8 | 2.9 | 77.9 |
| 1:2 | 47.2 | 1.0 | 2.4 | 2.6 | 68.3 |
| 1:5 | 58.7 | 0.9 | 3.3 | 3.4 | 74.7 |
| 1:7 | 62.6 | 0.8 | 3.2 | 3.3 | 76.0 |
| 1:15 | 70.2 | 0.7 | 3.0 | 3.1 | 77.0 |
| 1:30 | 76.8 | 0.6 | 2.8 | 2.9 | 77.7 |

TABLE 2.5

Color values of Example 9 for various lightening ratios

| Lightening ratio | L* | a* | b* | C* | h |
|---|---|---|---|---|---|
| Pure form | 29.5 | 1.1 | 5.6 | 5.7 | 78.9 |
| 1:10 | 71.3 | 1.0 | 3.7 | 3.8 | 74.9 |
| 1:20 | 77.7 | 1.0 | 3.2 | 3.4 | 72.6 |
| 1:30 | 80.9 | 1.0 | 2.9 | 3.1 | 71.0 |

TABLE 2.6

Color differences of certain pigment mixtures of Examples 1-10 lightened in a ratio of 1:10 in relation to the natural umber of Comparison Example 1

| Example | Coloring strength (%) | Δa* | Δb* | ΔC* |
|---|---|---|---|---|
| 1 | 151 | 0.3 | 0.1 | 0.1 |
| 2 | 154 | 0.5 | −0.9 | −0.6 |
| 9 | 107 | 0.1 | 0.2 | 0.2 |

TABLE 2.7

Color differences of the pigments mixtures of Examples 1 and 2 in relation to the natural umber of Comparison Example 1 for various lightening ratios (experimental lightness match)

| Lightening ratio | ΔL* | Δa* | Δb* | ΔC* |
|---|---|---|---|---|
| Example 1 | | | | |
| 1:3 | 0.0 | 0.4 | −1.1 | −0.9 |
| 1:5 | 0.0 | 0.5 | −0.6 | −0.4 |
| 1:10 | 0.0 | 0.4 | 0.9 | 0.1 |
| 1:15 | 0.0 | 0.4 | −0.2 | −0.1 |
| 1:20 | 0.0 | 0.4 | 0.2 | 0.3 |
| 1:30 | 0.0 | 0.3 | 0.3 | 0.4 |
| Example 2 | | | | |
| Pure form | 0.8 | 0.1 | 1.1 | 1.1 |
| 1:5 | 0.0 | 0.3 | 0.1 | 0.2 |
| 1:10 | 0.0 | 0.3 | 0.2 | 0.3 |
| 1:20 | 0.0 | 0.2 | 0.5 | 0.35 |
| 1:30 | 0.0 | 0.2 | 0.4 | 0.4 |

TABLE 2.8

Contents of the mixtures of Examples 1-10

| Example | % $Fe_2O_3$ | % Mn | % Cryst. quartz | % Water-soluble salts |
|---|---|---|---|---|
| 1 | 94 | | <0.1 | 0.8 |
| 2 | 94 | 0.5 | <0.1 | 0.9 |
| 3 | 93 | | <0.1 | — |
| 4 | 92 | | <0.1 | — |
| 5 | 91 | | <0.1 | — |
| 6 | 95 | | <0.1 | — |
| 7 | 94 | | <0.1 | — |
| 8 | 89 | | <0.1 | 0.5 |
| 9 | 90 | | <0.1 | 0.4 |
| 10 | 90 | | <0.1 | — |

— = not determined

TABLE 2.9

Other characteristic data of the mixtures of Example 1-10

| Example | $S_{BET}$ m²/g | Oil number g/100 g |
|---|---|---|
| 1 | 14 | 16 |
| 2 | 14 | 15 |
| 3 | 15 | 23 |
| 4 | 15 | 25 |
| 5 | 14 | 25 |
| 6 | 14 | 25 |
| 7 | 19 | 28 |
| 8 | 14 | 26 |
| 9 | 14 | 26 |
| 10 | — | 26 |

EXAMPLE 1

The pigment mixture of Example 1 both in pure form and in lightened form shows minor differences in color from the pigment of Comparison Example 1 (see Tables 1.2 and 2.4) and, with a coloring strength of 151%, is dinstinctly stronger in color. The pigment mixture contains less than 0.1% crystalline quartz and 0.8% water-soluble salts. The oil number and the specific surface, at 16 g/100 g and 14 m²/g, respectively, are distinctly lower than in the natural uncalcined umbers.

EXAMPLE 2

The pigment mixture corresponds in its properties to Example 1, but contains a smaller amount of soluble salts.

EXAMPLES 3-7

The pigment mixtures of Examples 3-9 both in pure form and lightened in a ratio of 1:10 show a relatively high yellow component and thus correspond to the natural uncalcined umbers with an increased yellow tinge as represented, for example, by Comparison Example 2.

EXAMPLES 8-10

The pigments of these Examples correspond coloristically to the natural umber of Comparison Example 1. The coloring strength is approximately 107%.

What is claimed is:

1. A synthetic pigment having the color of natural uncalcined umber which has an iron content, expressed as $Fe_2O_3$, of more than 85% by weight and a content of silica of less than 0.1% by weight.

2. A synthetic pigment as claimed in claim 1 which consist essentially of a mixture of synthetic magnetite black ($Fe_3O_4$) and at least one synthetic maghemite brown ($\gamma$-$Fe_2O_3$) or hematite red ($\alpha$-$Fe_2O_3$), with or without at least one synthetic goethite yellow ($\alpha$-FeOOH) or lepidocrocite orange ($\gamma$-FeOOH).

3. A synthetic pigment as claimed in claim 2 which contains magnetite black in quantities of 10 to 80% by weight, hematite red in quantities of 0 to 30% by weight, maghemite brown in quantities of 0 to 60% by weight, goethite yellow in quantities of 0 to 40% by weight and lepidocrocite orange in quantities of 0 to 10% by weight as constituents of the mixture.

4. A synthetic pigment as claimed in claim 2 which contains 50 to 75% by weight magnetic black, 1 to 40% by weight goethite yellow, 0 to 10% by weight hematite red and 0 to 30% by weight maghemite brown.

5. A synthetic pigment as claimed in claim 2 which contains less than 1.0% by weight soluble salts.

6. A synthetic pigment as claimed in claim 2, which contains from 0.5 to 0.9% by weight soluble salts.

7. A synthetic pigment as claimed in claim 1 wherein the color, expressed in CIELAB units by the color angle h and the saturation $C^*$, has values of 60 to 90 for h both in the pure form and in the form lightened with $TiO_2$ in a ratio of 1:10 and the saturation $C^*$ value is from 1 to 20.

8. A synthetic pigment as claimed in claim 7 wherein the saturation $C^*$ value is from 2 to 12.

9. A synthetic pigment as claimed in claim 1 which has a specific surface ($S_{BET}$) of 10 to 30 $m^2/g$.

10. A synthetic pigment as claimed in claim 9 which as a specific surface ($S_{BET}$) of 15 to 20 $m^2/g$.

11. In an improved pigmented paint or lacquer, the improvement comprises said paint of lacquer containing a pigmenting amount of synthetic pigment as claimed in claim 1.

12. In an improved building material containing a pigment, the improvement comprises said pigment being a pigment as claimed in claim 1.

* * * * *

UNITED STATES PATENT AND TRADEMARK OFFICE
CERTIFICATE OF CORRECTION

PATENT NO. : 5,085,706
DATED : February 4, 1992
INVENTOR(S) : Kuske et al

It is certified that error appears in the above-indentified patent and that said Letters Patent is hereby corrected as shown below:

At Column 1, line 68 "($\beta$-Fe$_2$O$_3$)" should read --($\alpha$-Fe$_2$O$_3$)--.

Column 2, line 1 "($\gamma$-FeOOH) should read --($\alpha$-FeOOH)--.

At Column 6, line 21 "dinstinctly" should read --distinctly--.

At Column 6, line 30 "contains a smaller amount" should read --contains a slightly higher amount--.

Column 6,
In claim 1, at Column 6, line 48 insert --crystalline-- after "content of".

In claim 2 line 51 "consist" should read --consists--.

Signed and Sealed this

Twenty-fourth Day of August, 1993

Attest:

BRUCE LEHMAN

*Attesting Officer*     *Commissioner of Patents and Trademarks*